April 4, 1961 A. C. LAWSON 2,978,639
MOVING MAGNET INSTRUMENT
Filed Dec. 15, 1958 2 Sheets-Sheet 1

INVENTOR.
Alfred C. Lawson
BY
Irving M. Freedman
His Attorney

April 4, 1961    A. C. LAWSON    2,978,639
MOVING MAGNET INSTRUMENT
Filed Dec. 15, 1958    2 Sheets-Sheet 2

INVENTOR.
Alfred C. Lawson
BY
Irving M. Freedman
His Attorney

United States Patent Office 2,978,639
Patented Apr. 4, 1961

2,978,639

MOVING MAGNET INSTRUMENT

Alfred C. Lawson, Peabody, Mass., assignor to General Electric Company, a corporation of New York Filed Dec. 15, 1958, Ser. No. 780,513

5 Claims. (Cl. 324—146)

The following invention relates to a moving magnet electric measuring instrument and, in particular, to a method of obtaining linear scale distribution in such an instrument.

Moving magnet instruments for measurement of direct current of the general type as the subject invention have been well known for a period of time and are exemplified by United States Patents No. 2,102,409 of Harold T. Faus, which issued December 14, 1937, and No. 2,354,555 of Frederick R. Sias, which issued July 25, 1944, both assigned to the same assignee as the present application, and also by the American Institute of Electrical Engineers Technical Paper No. 42–123, entitled "A New Moving Magnet Instrument for Direct Current," by H. T. Faus and J. R. Macintyre, dated May 1942. While such prior art devices have proved successful, difficulty has been experienced in obtaining a linear scale distribution characteristic. As shown under Figure 5 of the aforementioned A.I.E.E. publication, the scale distribution curve for moving magnet instruments normally approximates a sine wave characteristic rather than a true linear relationship.

It is an object of this invention to provide an improved moving magnet instrument in which the deflection characteristic is linear with changes of current under measurement.

It is another object of this invention to provide an improved moving magnet instrument having improved scale distribution control means.

Further objects and advantages of this invention will become apparent as the following description proceeds, and the features of novelty which characterize this invention will be pointed out with particularity in the claims annexed to and forming a part of this specification.

In accordance with one form of the invention, the moving magnet rotor of the instrument is made in the shape of a right circular cylinder with flatted sides. The rotor is polarized in a direction perpendicular to its axis of rotation. The angle of polarization of the permanent magnet rotor is made in the range of 20° to 30° from the minor axis thereof to achieve greatly improved linearity in the scale distribution.

For a better understanding of the invention, reference may be had to the accompanying drawings, in which:

Figure 4 is a plan view of another form of the rotor.

Figure 1:
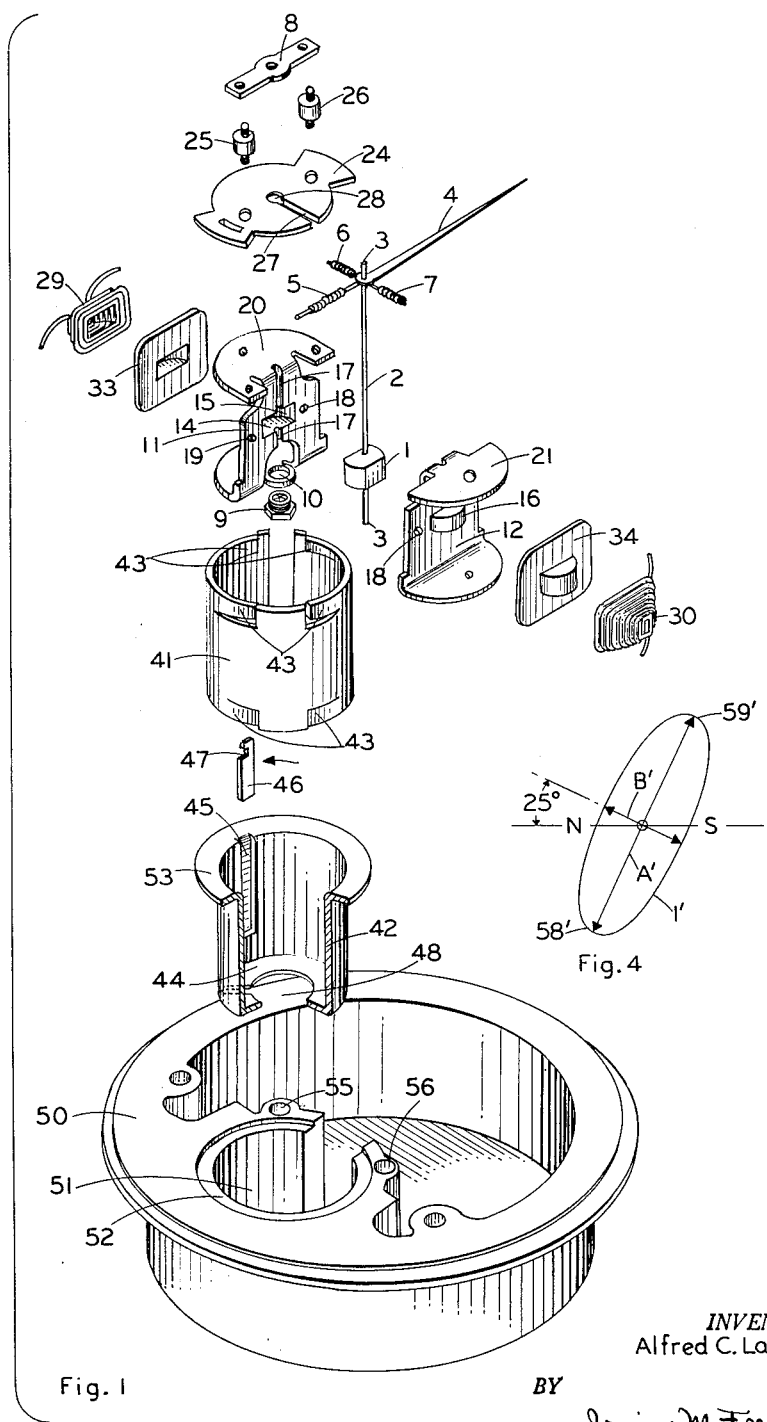
Figure 1 is an expanded isometric view of an instrument embodying the invention.
Figure 2:
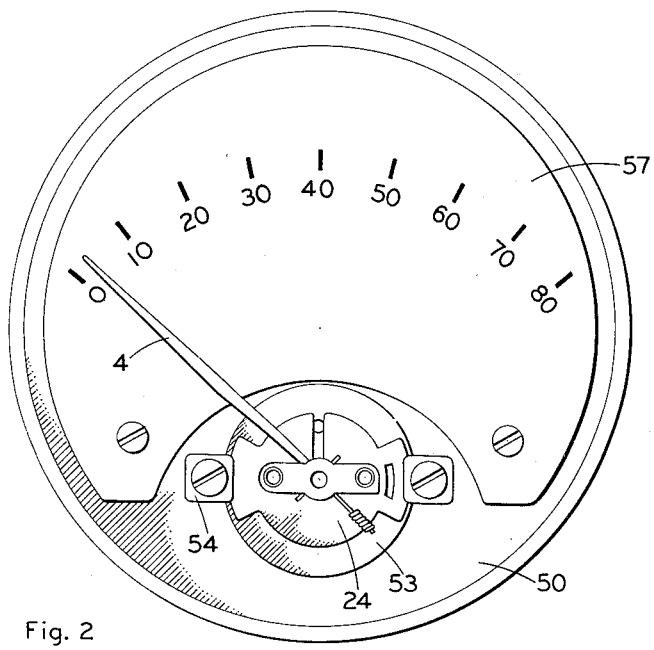
Figure 2 is a plan view of the instrument with the front cover removed for clarity.

Referring to Figures 1 and 2, the shaped permanent magnet rotor 1 is formed of magnetic material such as vectolite, a pressed and sintered cobalt-iron oxide, and is securely fastened to shaft 2 by suitable means such as cementing. Shaft 2 terminates at the outer ends in pivots 3 and has securely fastened thereto proximate to one end a pointer 4 along with its associated counterweight 5 for end balance and counterweights 6 and 7 for side balance. The shaft and rotor assembly is rotatably mounted through cooperation of the pivots 3 with glass jewels (not shown), one of which is fastened to the central region of the top bridge member 8 and the other of which is fastened to an adjustable jewel screw 9. The adjustable jewel screw 9 is threaded into an aperture 10 associated with one side of the frame 11. Frame side or member 11 along with the other side of the frame 12 are constructed of copper to provide the desired damping characteristics and encircle the shaft and rotor assembly without restraining the movement thereof. A central cavity 14 is formed by mating portions 15 and 16 which surround the shaped rotor 1, and an axial slot 17 within which the shaft 2 is rotatable is similarly formed by mating portions of frame sides 11 and 12. Each frame side contains appropriate holes and projections, such as hole 18 and projection 19, to insure proper alignment when assembled. The flatted upper ends 20 and 21 of the frame members 11 and 12 respectively underlie the top shield 24 which is formed of a metal such as that sold by the Allegheny Ludlum Steel Corporation under the trademark Mumetal and is staked to frame side 11 by the lower portions of spacer posts 25 and 26. The top bridge member 8 containing one of the rotor jewels is thus maintained in spaced relationship to the adjustable jewel screw 9 supported at the other end of frame side 11. A slot 27 in the Mumetal shield 24 provides a passageway for the shaft 2 to facilitate assembly of the instrument.

The coils 29 and 30 are of the self-supporting type positioned so as to closely surround the central cavity 14 in which the formed rotor 1 rotates but are separated from the mating portions 15 and 16 by insulating members 33 and 34 conveniently formed of a thin sheet of plastic such as that sold by the E. I. Du Pont Company under the trademark Mylar. Coils 29 and 30 are connected electrically in series, and the input leads are brought out to suitable terminal connections (not shown) for connection into the circuit under measurement. The coils 29 and 30 and frames 11 and 12 are held together by means of tape (not shown) wrapped around them.

The frame and coil assembly is then surrounded by wrap-around spring 41 and inserted within the Mumetal cup or shield 42. The wrap-around spring 41 has ears 43 at the top and bottom edges thereof formed inward to exert spring pressure on the top and bottom flanges of the frame members 11 and 12 and center the frame assembly in the cup 42. The cup 42 serves the functions of providing a low reluctance return path for the flux generated within it and shielding this flux from external fields. The cup 42 has a lower ridge 44 to assist in retaining the instrument mechanism within the cup. A formed groove 45 extends axially along the side of the cup member to receive a permanent magnet or control magnet 46 which is slidable axially within the groove and retained in place by pressure of the wrap-around spring 41. A notch 47 is formed in the upper end of the control magnet 46 to facilitate the axial adjustment thereof. The control magnet 46 is formed of Cunico, a copper-nickle alloy .042 inch thick, magnetized in the direction of the arrow shown in Figure 1. A centrally located aperture 48 formed by the lower ridge 44 of the cup 42 enables the electrical leads associated with the coils 29 and 30 to be brought out of the assembly in this region.

The assembly described thus far is then mounted in a suitable base or housing 50 which has formed therein an aperture 51 dimensioned to receive the cup 42 and having a ridge 52 to accommodate the rim 53 of cup 42. The cup 42 is retained within the aperture 51 by strap member 54 bridging the threaded apertures 55 and 56 and restraining rim 53 between the strap member and the ridge 52. A scale or dial 57 is secured to housing 50 and cooperates with pointer 4 to indicate the amount of deflection of the rotor 1 caused by current flow through the coils 29 and 30.

Figure 3:
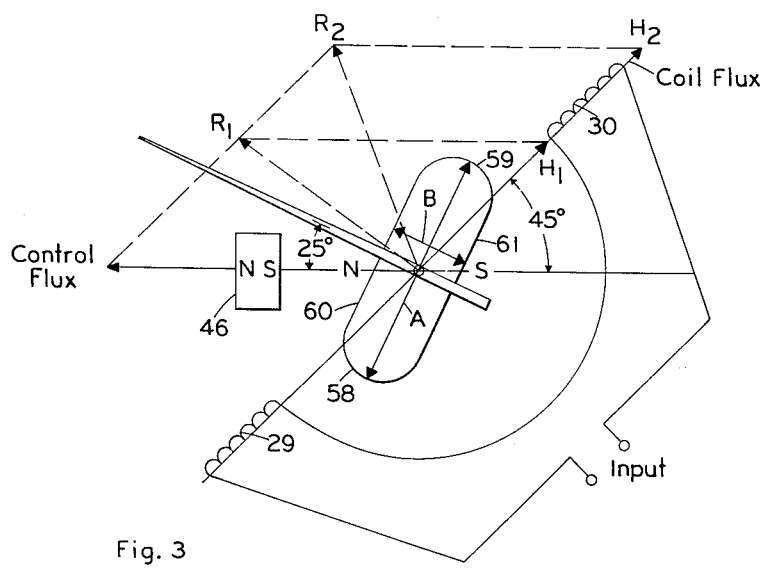
Figure 3 is a plan view, partially in schematic form, of the rotor and associated magnetic field producing members and including a vector diagram useful in explaining the operation of instruments embodying the invention.

The shape of the permanent magnet rotor 1 and its position relative to control magnet 46 and the coils 29 and 30 for a zero-left 90° instrument is shown in Figure 3. Referring to Figure 3, the permanent magnet rotor 1 is shown as viewed from the top in the direction of the axis of rotation. End or opposed portions 58 and 59 are surfaces defined by a right circular cylinder having a diameter which may conveniently be defined as the major axis of the rotor and identified in Figure 3 in the central region thereof by the letter "A." The axis at right angles to "A" and perpendicular to the flatted surfaces or connecting portions 60 and 61, identified by the letter "B" in Figure 3, may be conveniently defined as the minor axis. The flatted surfaces 60 and 61 are parallel to major axis "A" in the symmetrical embodiment of the rotor illustrated. "A" is .252 inch, while "B" is .190 inch. A symmetrical rotor is preferred, since it facilitates manufacturing of the rotor and balancing of the moving system.

The magnetic polarization of the rotor 1 is made such that the north and south poles lie on a line which makes an angle with the minor axis of 20° to 30°, 25° being shown in Figure 3. In practice, it has been observed that rotors polarized in that range provide scale distribution characteristics which deviate less than one percent from a linear distribution. Polarization outside the range of 20° to 30° results in greater deviations.

In a typical 90° instrument, the coils 29 and 30 are positioned such that their axis is 45° from that of the control magnet, and the flux produced by current flow therethrough is displaced 135° from that produced by the control magnet. Of course, the control flux could be produced by one or more properly positioned coils rather than through the use of a permanent magnet such as 46.

As is well known in the art, and as explained in more detail in the aforementioned A.I.E.E. article, the moving magnet aligns itself with the resultant of the flux produced by the control magnet 46 and that produced by the current flow through the coils 29 and 30. With zero current flow through the coils, the resultant of the fluxes is the control flux and the rotor 1 assumes the position shown in Figure 3, with the north pole of the rotor proximate to the south pole of the control magnet 46 and the polarization of the two magnets in alignment.

Reference to the vector diagrams associated with Figure 3 will help to explain the operation of the instrument. As current flows through the coils 29 and 30, the coil flux $H_1$ developed in combination with the fixed control flux produces a resultant $R_1$ with which the poles of the rotor 1 will become aligned through clockwise rotation of the rotor. A further increase of the coil current will develop a coil flux $H_2$ which in combination with the control flux produces a resultant $R_2$ which is rotated clockwise from $R_1$. Thus, as current under measurement increases, the resultant flux vector rotates in a clockwise direction and the rotor 1 rotates a corresponding amount. The instrument pointer 4 associated with the rotor 1 indicates the amount of rotation as a measure of the current flow through the coils 29 and 30.

In prior art devices, it has been the practice to magnetize the permanent magnet rotor along the principal axis whether the instrument utilized a circular type of rotor, as exemplified by the aforementioned A.I.E.E. article, or whether a flatted rotor were utilized, as typified by the aforementioned Sias patent. However, such arrangements have not provided a very desirable linear scale distribution when utilized on zero-left or zero-right instruments, and particularly at lower values of current in the measurement range. The non-linearity is due particularly to the sinusoidal relationship of the torque produced.

During the operation of the improved instrument described, as the coil flux increases due to increased current under measurement, the rotor 1 follows the resultant vector which rotates in a clockwise direction. Rotation of the rotor 1 decreases the air gap between the rotor and the control magnet 46 causing an effective change in the magnitude of the control magnet field to compensate for the inherent non-linearities of the prior art arrangements and produce an angular deflection characteristic which varies linearly with coil current. The magnitude of the effective control magnet flux vector is thus varied over the deflection range of the instrument through changes in the coupling of the rotor field and the control magnet field.

It has been found that the change in coupling between the rotor and the control magnet for the instrument described should increase rapidly for approximately the first half of the scale then level off and even decrease slightly in the upper 20 percent region of the scale. Figure 4 shows an alternate form of the rotor 1 which will accomplish the desired results. The elliptical or approximately elliptical cross section has a major axis "A'" and a minor axis "B'" with the polarization being at an angle of 25° from the minor axis, as shown. If the rotor 1 of Figure 4 were substituted in the arrangement of Figure 3, it is apparent that as the current under measurement increases and the rotor tracks the resultant of the coil flux and the control flux, the air gap between the rotor 1' and the control magnet 46 will decrease rapidly over the initial portion of the operating range of the instrument, after which the rate of change of the air gap will level off. With further increases of current under measurement in the terminal portion of the operating range, the air gap will increase. The control magnet 46 sees a variable reluctance as the rotor 1' turns upscale, accomplishing an effective variable control magnet field, and a scale distribution with improved linearity is realized.

While a rotor having an approximately elliptical section could provide the desired results, such further shaping and removal of rotor material would be more difficult to accomplish and would sacrifice torque and dynamic properties. It has been found in practice that the desired results are possible through use of the simpler flatted rotor shaped and polarized as shown in Figure 3.

While Figure 3 shows a zero-left instrument, it is apparent that the subject invention could be applied to a zero-right instrument. In a zero-right instrument, the control magnet would be positioned by rotating it 90° counterclockwise about the axis of the rotor, and the rotor 1 would be secured to shaft 2 in an inverted position from that thus shown in Figure 3. The rotor polarization is then effectively 25° clockwise rather than counterclockwise from the minor axis.

Having thus described the invention, it is to be understood that the foregoing disclosure relates only to preferred embodiments of the invention and the numerous modifications or alterations may be made therein without departing from the spirit or scope of the invention as set forth in the appended claims.

What I claim as new and desire to secure by Letters Patent of the United States is:

1. In a zero-left or zero-right electrical measuring instrument of the moving magnet type, a movable rotor comprising a permanent magnet polarized in a direction transverse to the axis of rotation thereof, a control magnet and at least one current coil positioned such that the magnetic fluxes produced thereby will link said rotor, said control magnet being positioned to the side of said permanent magnet rotor such that a plane through said rotor transverse to the axis of rotation thereof will pass through the control magnet, said fluxes being spaced about said axis of rotation approximately 135° from each other, said rotor having a cross section in a plane perpendicular to said axis with diametrically opposed peripheral portions of substantially constant radius and flatted peripheral portions spaced substantially less from said axis of rotation than said opposed portions, said flatted portions connecting the adjacent ends of said opposed portions, and said rotor being polarized approximately 25° from the perpendicular bisector of said connecting portions.

2. In a zero-left or zero-right electrical measuring instrument of the moving magnet type which includes a control magnet to establish the zero position, a movable rotor comprising a permanent magnet polarized in a direction transverse to the axis of rotation thereof, said rotor having a cross section in a plane perpendicular to said axis with diametrically opposed peripheral portions at least one of which is of substantially constant radius from said axis of rotation, and peripheral portions connecting the adjacent ends of said opposed portions, at least one of said connecting portions being spaced from the axis of rotation a distance less than the constant radius, and at least one current coil positioned such that the magnetic fluxes produced thereby will link and interact with the flux of said rotor to cause rotor rotation in accordance with the current flow through the coil, the fluxes of said control magnet and coil being angularly displaced from each other about said axis of rotation, said control magnet being positioned to the side of said permanent magnet rotor such that a plane through said rotor transverse to the axis of rotation thereof will pass through the control magnet, said rotor being polarized approximately 25° from the line connecting the central regions of said connecting portions, the polarization of said rotor being such that the gap between the rotor and said control magnet decreases over the initial portion of the operating range of the instrument as said rotor is rotated.

3. In a zero-left or zero-right electrical measuring instrument of the moving magnet type which includes a control magnet to establish the zero position, a movable rotor comprising a permanent magnet polarized in a direction transverse to the axis of rotation thereof, said rotor being substantially symmetrical about a plane which includes its axis of rotation and having a cross section in a plane perpendicular to said axis with diametrically opposed peripheral portions of substantially constant radius, and flatted peripheral portions connecting the adjacent ends of said opposed portions, and at least one current coil positioned such that the magnetic fluxes produced thereby will link and interact with the flux of said rotor to cause rotor rotation in accordance with the current flow through the coil, the fluxes of said control magnet and coil being angularly displaced from each other about said axis of rotation, said control magnet being positioned to the side of said permanent magnet rotor such that a plane through said rotor transverse to the axis of rotation thereof will pass through the control magnet, said rotor being polarized approximately 25° from the perpendicular bisector of said connecting portions such that the gap between said rotor and said control magnet decreases over the initial portion of the operating range of the instrument and then remains constant for at least another portion of the operating range of the instrument as said rotor is rotated.

4. In a zero-left or zero-right electrical measuring instrument of the moving magnet type which includes a control magnet to establish a zero position, a movable rotor comprising a permanent magnet polarized in a direction transverse to the axis of rotation thereof, said rotor being substantially symmetrical about a plane which includes its axis of rotation and having a cross section in a plane perpendicular to said axis which is substantially elliptical with a major and a minor axis, and at least one current coil positioned such that the magnetic fluxes produced thereby will link and interact with the flux of said rotor to cause rotor rotation in accordance with the current flow through the coil, the fluxes of said control magnet and coil being angularly displaced from each other about said axis of rotation, said control magnet being positioned to the side of said permanent magnet rotor such that a plane through said rotor transverse to the axis of rotation thereof will pass through the control magnet, said rotor being polarized approximately 25° from said minor axis such that the gap between the rotor and said control magnet decreases over the initial portion of the operating range of the instrument as said rotor is rotated.

5. In a zero-left or zero-right electrical measuring instrument of the moving magnet type which includes a control magnet to establish the zero position, a movable rotor comprising a permanent magnet polarized in a direction transverse to the axis of rotation thereof, said rotor having a cross section in a plane perpendicular to said axis of rotation with diametrically opposed peripheral portions, and peripheral portions connecting the adjacent ends of said opposed portions, at least one of said connecting portions being spaced from the axis of rotation a distance less than one of said opposed portions, the periphery of said cross section being such that the major and longer axis is through said diametrically opposed portions and the minor and shorter axis is substantially at right angles thereto and through said connecting portions, said control magnet being positioned to the side of said permanent magnet rotor such that a plane through said rotor transverse to the axis of rotation thereof will pass through the control magnet, and at least one current coil positioned such that the magnetic fluxes produced thereby will link and interact with the flux of said rotor to cause rotor rotation in accordance with the current flow through the coil, the fluxes of said control magnet and coil being angularly displaced from each other about said axis of rotation, said rotor being polarized substantially along a direction at an acute angle of approximately 20° to 30° to the minor axis and through the central region of said connecting portions such that the gap between the rotor and said control magnet decreases over the initial portion of the operating range of the instrument as said rotor is rotated.

References Cited in the file of this patent

UNITED STATES PATENTS

| | | |
|---|---|---|
| 2,345,936 | Jewell | Apr. 4, 1944 |
| 2,367,065 | Sias | Jan. 9, 1945 |
| 2,446,579 | Fritzinger | Aug. 10, 1948 |
| 2,484,567 | Hoare | Oct. 11, 1949 |

FOREIGN PATENTS

| | | |
|---|---|---|
| 525,092 | Great Britain | Aug. 21, 1940 |